(12) United States Patent
Kwong

(10) Patent No.: US 11,893,298 B2
(45) Date of Patent: *Feb. 6, 2024

(54) MULTI-PLATFORM INTEGRATED DISPLAY

(71) Applicant: Epic Optix, Inc., Annapolis, MD (US)

(72) Inventor: Ray Kwong, Annapolis, MD (US)

(73) Assignee: EPIC OPTIX INC., Annapolis, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/819,454

(22) Filed: Aug. 12, 2022

(65) Prior Publication Data

US 2023/0145665 A1    May 11, 2023

Related U.S. Application Data

(63) Continuation of application No. 16/427,618, filed on May 31, 2019, now Pat. No. 11,422,764.

(60) Provisional application No. 62/679,904, filed on Jun. 3, 2018.

(51) Int. Cl.
| | |
|---|---|
| *G06F 3/14* | (2006.01) |
| *B60R 1/00* | (2022.01) |
| *F41G 3/22* | (2006.01) |
| *B64D 45/00* | (2006.01) |
| *B63B 49/00* | (2006.01) |

(52) U.S. Cl.
CPC .................. *G06F 3/14* (2013.01); *B60R 1/00* (2013.01); *B63B 49/00* (2013.01); *B64D 45/00* (2013.01); *F41G 3/22* (2013.01)

(58) Field of Classification Search
CPC .. G06F 3/14; B60R 1/00; B60R 11/04; B64D 45/00; B63B 35/44; B63B 21/50; B63B 35/4413

See application file for complete search history.

(56) References Cited

U.S. PATENT DOCUMENTS

| | | | |
|---|---|---|---|
| 11,422,764 B1 * | 8/2022 | Kwong | B64D 45/00 |
| 2008/0034954 A1 * | 2/2008 | Grober | F41G 3/165 |
| | | | 89/41.02 |

* cited by examiner

*Primary Examiner* — Matthew A Eason
*Assistant Examiner* — Scott D Au

(57) ABSTRACT

Augmented reality display systems, apparatuses, and methods are disclosed for enabling a wearer of an augmented reality optical display to continue wearing the same optical display while moving between different platforms or vehicles. Example embodiments include optical displays that use a wired connection to connect with each platform to minimize the electromagnetic signature of the system. Embodiments include changing the information displayed to the user depending on the type of vehicle to which the optical display is connected. Additional embodiment display information about weapon systems associated with the platform to which the optical display is connected.

19 Claims, 4 Drawing Sheets

MULTI-PLATFORM INTEGRATED DISPLAY

CROSS-REFERENCE TO RELATED APPLICATIONS

This application is a continuation of U.S. application Ser. No. 16/427,618, filed 31 May 2019, which is scheduled to issue 23 Aug. 2022 as U.S. Pat. No. 11,422,764, which claims the benefit to U.S. Provisional Patent Application No. 62/679,904, filed 3 Jun. 2018, the entireties of which are hereby incorporated herein by reference. Any disclaimer that may have occurred during the prosecution of the above-referenced application is hereby expressly rescinded.

FIELD

Embodiments of this disclosure relate generally to augmented reality systems and devices.

BACKGROUND

Systems have been used to display various types of information, such as information from RADAR or infrared sensors, allowing the user to view information that is not visible by the user's unaided eye. Some systems, such as certain types of night vision goggles, can display information to a user via a transparent panel (sometimes referred to as a combiner) allowing the user to see the information superimposed over the user's view of the environment. Other example systems include heads up displays that are frequently used in airborne platforms, for example, rotary-wing aircraft, and display information concerning the platform's orientation and weapon systems integrated with the platform. However, it was realized by the inventor of the current disclosure that deficiencies exist with known systems, such as the inability of a user to wear a display that presents information associated with a first platform to the user, change to a second platform wearing the same display, and have the display present information associated with the second platform to the user.

Certain preferred features of the present disclosure address these and other needs and provide other important advantages.

SUMMARY

Embodiments of the present disclosure provide an improved multi-platform integrated display.

Particular embodiments provide a wearable augmented reality device that displays platform-related information to the wearer and connects to different types of platforms (for example, vehicles or stand-alone weapons systems) presenting to the wearer through the same display platform-specific information for the platform to which the augmented reality device is connected.

This summary is provided to introduce a selection of the concepts that are described in further detail in the detailed description and drawings contained herein. This summary is not intended to identify any primary or essential features of the claimed subject matter. Some or all of the described features may be present in the corresponding independent or dependent claims, but should not be construed to be a limitation unless expressly recited in a particular claim. Each embodiment described herein does not necessarily address every object described herein, and each embodiment does not necessarily include each feature described. Other forms, embodiments, objects, advantages, benefits, features, and aspects of the present disclosure will become apparent to one of skill in the art from the detailed description and drawings contained herein. Moreover, the various apparatuses and methods described in this summary section, as well as elsewhere in this application, can be expressed as a large number of different combinations and subcombinations. All such useful, novel, and inventive combinations and subcombinations are contemplated herein, it being recognized that the explicit expression of each of these combinations is unnecessary.

BRIEF DESCRIPTION OF THE DRAWINGS

Some of the figures shown herein may include dimensions or may have been created from scaled drawings or photographs. However, such dimensions, or the relative scaling within a figure, are by way of example, and not to be construed as limiting.

DETAILED DESCRIPTION OF THE ILLUSTRATED EMBODIMENTS

Figure 1:
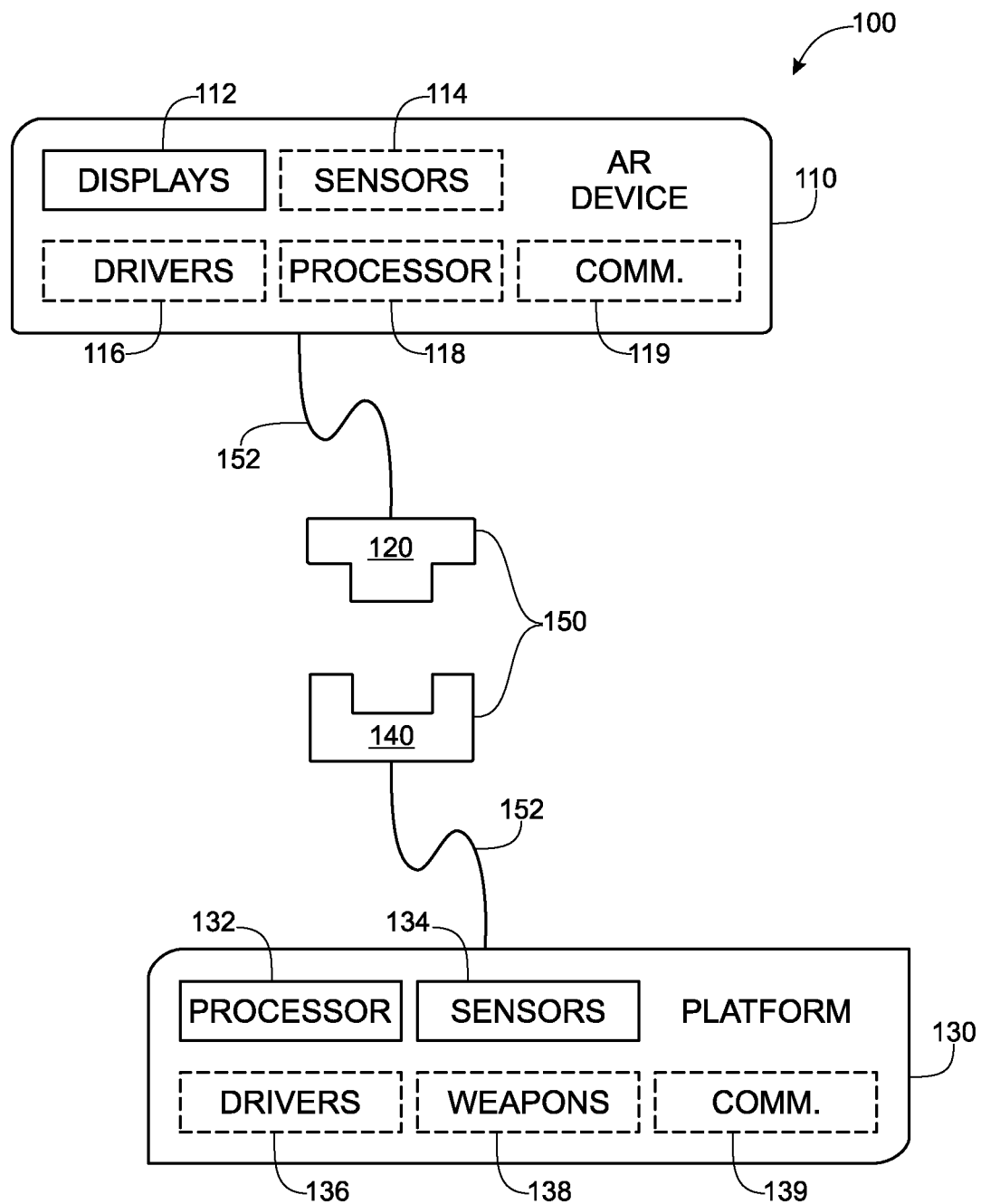
FIG. 1 is a schematic block diagram of an augmented reality system according to one embodiment of the present disclosure.

For the purposes of promoting an understanding of the principles of the disclosure, reference will now be made to one or more embodiments, which may or may not be illustrated in the drawings, and specific language will be used to describe the same. It will nevertheless be understood that no limitation of the scope of the disclosure is thereby intended; any alterations and further modifications of the described or illustrated embodiments, and any further applications of the principles of the disclosure as illustrated herein are contemplated as would normally occur to one skilled in the art to which the disclosure relates. At least one embodiment of the disclosure is shown in great detail, although it will be apparent to those skilled in the relevant art that some features or some combinations of features may not be shown for the sake of clarity.

At least one embodiment of the present disclosure includes an augmented reality system with at least one augmented reality device (which may be referred to as an ARD) and a connection location for the augmented reality device on at least two different vehicles. In some embodiments, the augmented reality device is a helmet worn by a user that displays information specific to the vehicle to which the augmented reality device is connected to the user. The display may also allow the wearer to see the wearer's environment, much like a pair of glasses, while displaying the vehicle-related information so the wearer can view the wearer's surroundings while simultaneously viewing the vehicle-related information. The augmented reality device is capable of connecting to and disconnecting from various types of platforms (for example, man-portable systems, air vehicles, ground vehicles, surface water vehicles, and submergible water vehicles) and varies the information displayed to the wearer based on the platform to which the augmented reality device is connected.

Figure 2:
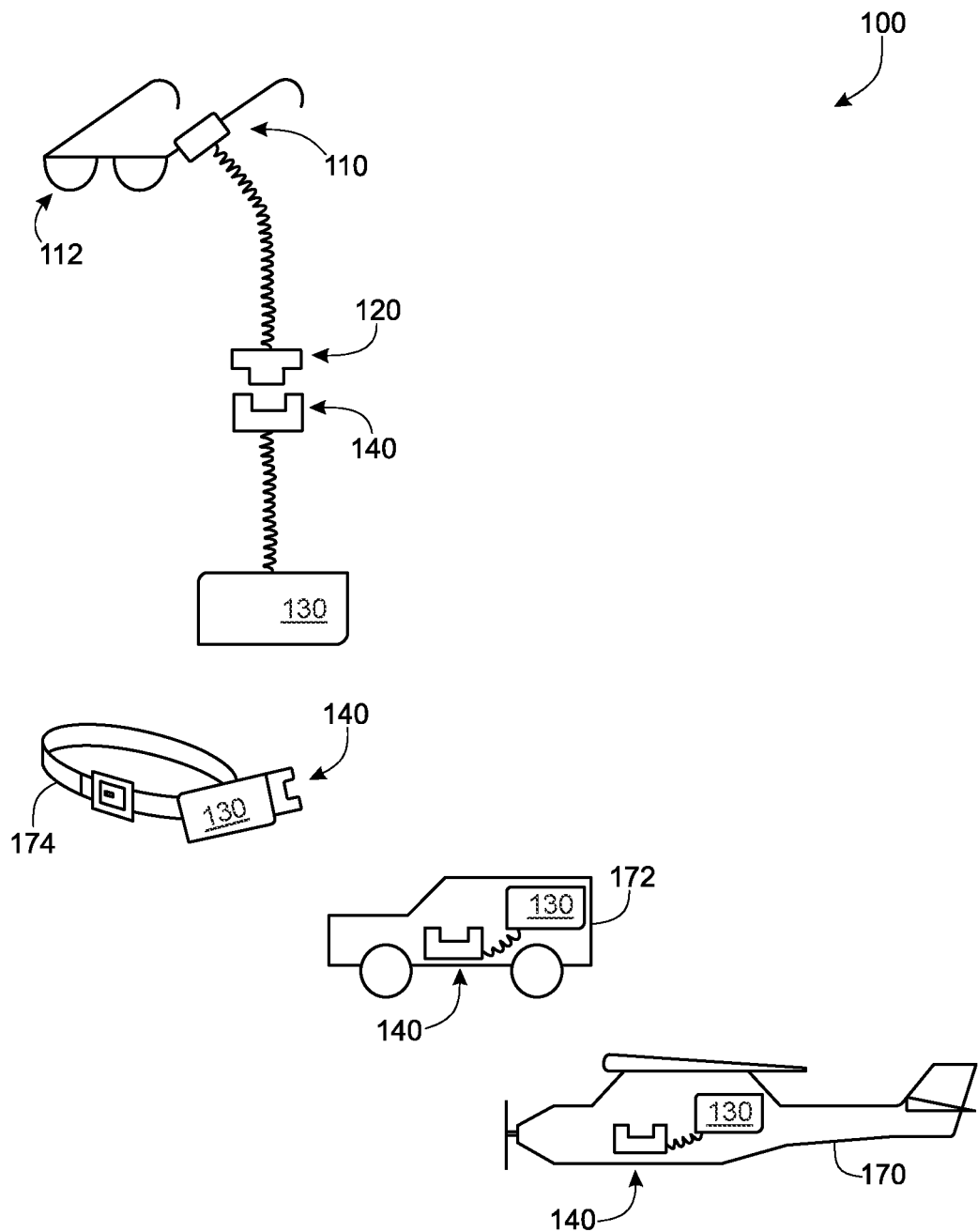
FIG. 2 depicts the augmented reality system of claim 1 with the platform assembly associated with different platforms.

Shown in FIGS. 1 and 2 is an augmented reality system 100 according to one embodiment of the present disclosure. Augmented reality system 100 includes an augmented reality device 110 and a platform assembly 130 connectable to one another using display and/or data interface 150. The augmented reality system 100 is capable of changing the information displayed to the user based on the type of platform assembly to which the augmented reality device 110 is attached.

The augmented reality device 110 is wearable by a user and includes an optical display 112 capable of delivering visual information to the wearer and typically (but not necessarily) allows the wearer to also view the wearer's environment through the optical display 112. The augmented reality device 110 can be a helmet, dive mask, ballistic goggles, visor, glasses, monocles, or any device that can display optical information to a wearer. The augmented reality device 110 optionally includes one or more sensors 114, display drivers 116, processors 118, communication systems 119, or any combination thereof. The augmented reality device 110 is connected via a data cord 152 to connector 120, which forms part of data interface 150.

Processor 118 are generally capable of processing and executing general (system) and specific (apps) programs.

Sensors 114 are generally capable of sensing information concerning the environment in which the augmented display device 110 is located. Example sensors 114 include night vision devices, thermal imaging systems, near IR imaging systems, hyperspectral cameras, clocks, position/orientation tracking systems, and user interfaces, including, for example, eye trackers and user input devices.

Example communication devices 119 include components capable of communicating via various wired and wireless networks and protocol, including cellular telephone, radio frequency (RF), Bluetooth®, Wifi®, satellite, and/or various types of built-in apps, which can be built on standard APIs.

The platform assembly 130 includes one or more processors 132 and sensors 134. Processors 132 are generally capable of processing and executing general (system) and specific (apps) programs. The platform assembly 130 optionally includes one or more display drivers 136, weapon systems data input modules 138, data communication modules 139, or any combination thereof. The platform assembly 130 can be attached to different types of platforms, for example, surface water vehicles, subsurface water vehicles, air vehicles, land vehicles, and wearable platform devices. Example wearable platform devices include GPS systems, accelerometers, motion detectors, inertial navigation systems, rangefinders, targeting systems, and weapon systems. Platform assembly 130 is connected via a data cord 152 to connector 140, which in a similar manner to connector 120 forms part of data interface 150.

Processor 132 is generally capable of processing and executing general (system) and specific (apps) programs.

Sensors 134 are generally capable of sensing information concerning the environment in which the platform assembly 130 is located, the environment in which the platform connected to the platform assembly 130 is located, an operational state of the platform connected to platform assembly 130, and/or an operational state of a weapon system associated with the platform connected to platform assembly 130. Example sensors 134 include passive and active sensing systems, including but not limited to, environmental sensors, night vision sensors, infrared sensors, thermal detectors, near IR imaging systems, hyperspectral sensors, LIDAR (light detection and ranging) systems, acoustic sensors, accelerometers, magnetometers, barometers, RADAR systems, RF sensors, non-cooperative target recognition sensors, Global Positioning System (GPS) receivers, gyroscopes, weapon sensors, weapon cueing sensors, video cameras, compasses, speedometers, clocks, systems for detecting the position and/or orientation of the optical display 112, and user interfaces.

Example communication devices 139 include components capable of communicating via various wired and wireless networks and protocol, including cellular telephone, radio frequency (RF), Bluetooth®, Wifi®, satellite, and/or various types of built-in apps, which can be built on standard APIs.

The display and data interface 150 includes portions from the augmented reality device 110 (for example, connector 120) and the platform assembly 130 (for example, connector 130). These separate portions can be hand connected to one another and hand disconnected from one another. Information (such as video data) can be transferred between the display and data interface 150 and the platform assembly 130 using display and data interface 150. In some embodiments, the display and data interface 150 transmits power from the platform assembly 130 to the augmented reality device 110. In some embodiments, the processors 118 in the augmented reality device 110 and in the platform assemblies 130 have a common operating system (OS), application development environment, and/or application programming interfaces (APIs) to facilitate communication between the augmented reality device 110 and the platform assembly 130.

In certain embodiments, the display and data interface 150 includes a matrix switch through which various sensors can be connected to augmented reality system 100. The matrix switch may be operationally connected to connector 120, connector 140 or a data cord 152. For example, one or more sensors can be connected to the matrix switch and the information from the one or more sensors will be integrated into a single visual image on the optical display 112 for the user to view.

When the augmented reality device 110 is connected to the platform assembly 130, the processor 132 in the platform assembly 130 receives data from one or more sensors 134 associated with the platform assembly 130 and transmits the sensor data to the optical display 112 in the augmented reality device 110 via the display and data interface 150. In some embodiments, the optional display driver 136 in the platform assembly 130 generates and transmits the proper display input to the optical display 112 via the display and data interface 150, while in other embodiments the optional display driver 116 in the augmented reality device 110 generates and transmits the proper display input for the optical display 112.

The augmented reality device 110 can have common features displayed to the wearer no matter what platform the wearer is using. For example, in all display modes the compass direction the augmented reality device 110 is facing and the speed at which the augmented reality device 110 is moving (for example, due to vehicle movement when connected to a vehicle) may always be displayed to the wearer no matter which vehicle (air, ground, water) the ARD is connected to.

In some embodiments, the augmented reality device 110 varies the information displayed to the wearer on optical display 112 depending on the platform to which the augmented reality device 110 is connected. For example, the augmented reality device 110 may present different information to the wearer depending on the particular vehicle (or particular type of vehicle) to which the augmented reality device 110 is connected. In one embodiment, the augmented reality device 110 may have a set number of total display features that may be displayed irrespective of the platform to which it is connected. When attached to one type of platform (for example, a ground vehicle), a particular set of features is displayed to the wearer—for example, vehicle heading, vehicle speed, and a steering command. If the platform has a particular type of weaponry (for example, a gun that may be aimed using the AR Display), a different sub-set of features will be displayed to the wearer—for example, a weapon aiming cue and armament indication. When attached to an air vehicle, the display may include an artificial horizon, altitude (MSL and/or AGL), and airspeed. In these embodiments the one or more processors in the augmented reality device 110 and/or platform assembly 130 will recognize the type of platform to which the augmented reality device 110 is connected and will automatically select the set of display features depending on the platform and the specific hardware (or software) installed on the platform. In some embodiments the set of display features can be selected by the user, such as prior to a mission, so the user is presented with only the display features desired by that particular user.

In one example embodiment, the platform assembly 130 is connected to an air vehicle 170, for example an aircraft, which has one or more visual cameras, airspeed sensors, altimeters, accelerometers, gyroscopes, barometers, compasses, or similar aviation related sensors. When the augmented reality device 110 is connected to the platform assembly 130, the optical display 112 includes, for example, altitude, airspeed, aircraft attitude information, and video information of locations where the user can not normally see (for example, directly underneath the cockpit) allowing the wearer to properly fly the aircraft.

In another example embodiment, the platform assembly 130 is connected to a ground vehicle 140, for example an automobile, which has one or more infrared sensors, ground-speed sensors, accelerometers, gyroscopes, compasses, GPS receivers, or similar ground navigation related sensors. When the augmented reality device 110 is connected to the platform assembly 130, the optical display 112 includes, for example, groundspeed, map position, and visual information for seeing at night with its standard headlights turned off, allowing the wearer to properly drive the automobile.

Sensors may also be integrated into the augmented reality device 110 with data from these sensors being optionally provided to the platform/vehicle and/or platform assembly. For example, the augmented reality device 110 may be a helmet with a night vision camera and/or a Near IR camera attached to it, and this information along with helmet orientation information could be transmitted to a weapon system, such as a heat seeking missile system, via the platform assembly 130.

Embodiments of the present disclosure intentionally use a physical connection between augmented reality device 110 and platform assembly 130, such as display and data interface 150 using shielded data cords 152 and connectors 120,140. In these embodiments, the data being transferred back and forth between the various components of the augmented reality system 100 is not detectable by equipment not connected to the augmented reality system 100, diminishing or eliminating the ability of another party, for example a hostile party, to detect the presence of augmented reality system 100.

However, augmented reality systems 100 operating in more permissive environments, such as for use by someone in the general public, who is generally not concerned about the system's electromagnetic signature, can transmit information between augmented reality device 110 and platform assembly 130 using wireless communication.

Figure 3:
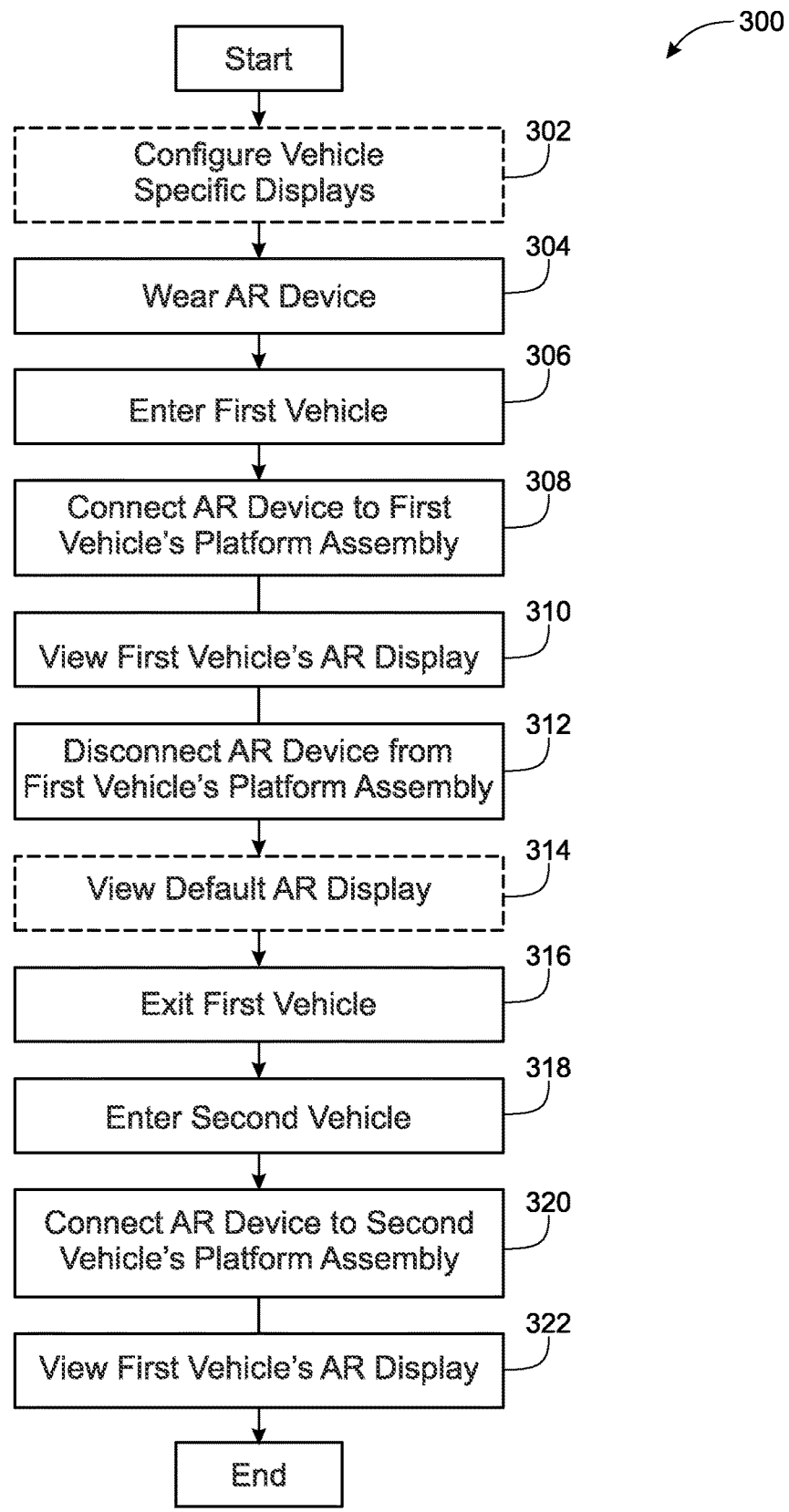
FIG. 3 is a process diagram of an illustrative embodiment of a user employing a multi-platform integrated display.

Depicted in FIG. 3 is a process diagram of an illustrative embodiment of a user employing a multi-platform integrated display 300. While the method 300 refers to one or more vehicles, vehicle-specific data, and vehicle platform assemblies 130, platform assemblies 130 may also be associated with other devices, such as wearable platforms 174, which may be attached to a belt or other for device worn by a user.

At step 302, a user optionally configures one or more vehicle-specific user displays. For example, to configure the one or more vehicle-specific user displays, the user can use user interfaces associated with sensors 114 or 134 to select which information the user would like displayed on the optical display 112 when connected to different platforms.

At step 304, a user puts on an augmented reality device 110. As described herein, the augmented reality device 110 is equipped with an optical display 112, and a combination of optional sensors 114, display drivers 116, processors 118, and communication systems 119. The augmented reality device 110 also includes a data cord 152, which is connectable, via a display and data interface 150, to one or more platform assemblies 130 in various vehicles (for example, vehicles 170 and 172) or other data interface environments (for example, user-wearable devices 174). The augmented reality device 110 is configured to display information to the user on the optical display 112, which is positioned in the user's field of vision.

At step 306, the user enters a first vehicle having a platform assembly 130 capable of being coupled via the data cord 152 and connector 140 to the connector 120 on the augmented reality device 110. At step 308, the user connects the augmented reality device 110 to the vehicle's platform assembly 130 via the display and data interface 150 to allow data to transfer from the platform assembly 130 to the augmented reality device 110. For example, if the user steps into an air vehicle, such as an optionally piloted vehicle (OPV) or an aircraft 170, the user will plug the connector 120 of augmented reality device 110 into the connector 140 of the platform assembly 130 associated with the vehicle. Once the data has begun transferring, the user can (at step 310) view the data transferred by the vehicle's platform assembly 130 on the optical display 112 of the augmented reality device 110. The optical display 112 may display the data in a manner preconfigured by the user in step 302, or if a display was no preconfigured, the optical display 112 may default to displaying the data in a manner predetermined (optionally based on an algorithm) to be appropriate for data received.

At step 312, once the user is ready to discontinue viewing the vehicle data, the user can disconnect the augmented reality device 110 from the vehicle's platform assembly 130. For example, continuing from the prior example, the user disconnects from the air vehicle once the air vehicle lands. Optionally, at step 314, processor 118 recognizes the disconnection and the augmented reality device 110 may default to an optical presentation that is preconfigured by the user to display on the optical display 112 when augmented reality device 110 is disconnected from a platform assembly 130. For example, data generated by any sensor or data collection device associated with the augmented reality device 110 can be displayed to the user. At step 316, the user exits the vehicle and can continue wearing the augmented reality device 110

Advantageously, the augmented reality device 110 of the present disclosure can be configured to connect to multiple different types of platforms, for example, different types of vehicles, each with a platform assembly 130. At step 318, the user can enter a second vehicle that is a different vehicle (or a different type of vehicle) than the first vehicle and, at step 320, connect the augmented reality device 110 to the second vehicle's platform assembly 130 via display and data interface 150. The second vehicle can be, for example, a ground vehicle that presents a different set of data to the user. The augmented reality system 100 of the second vehicle initializes sensors and data presentation to the optical display 112 and calibrates the head-tracking system so the information (such as weapon designation information) displayed to the user through optical display 112 is accurate. The user can now see vehicle instrument data such as speed, GPS and route mapping. The optical display 112 can also provide target aiming and designation for installed weapon systems. Any installed cameras on the vehicle can also be presented to the optical display 112. At step 322, the user can view the second vehicle's data, which is vehicle-specific, on the optical display 112 which is optionally pre-configurable by the user as noted in step 302.

Figure 4:
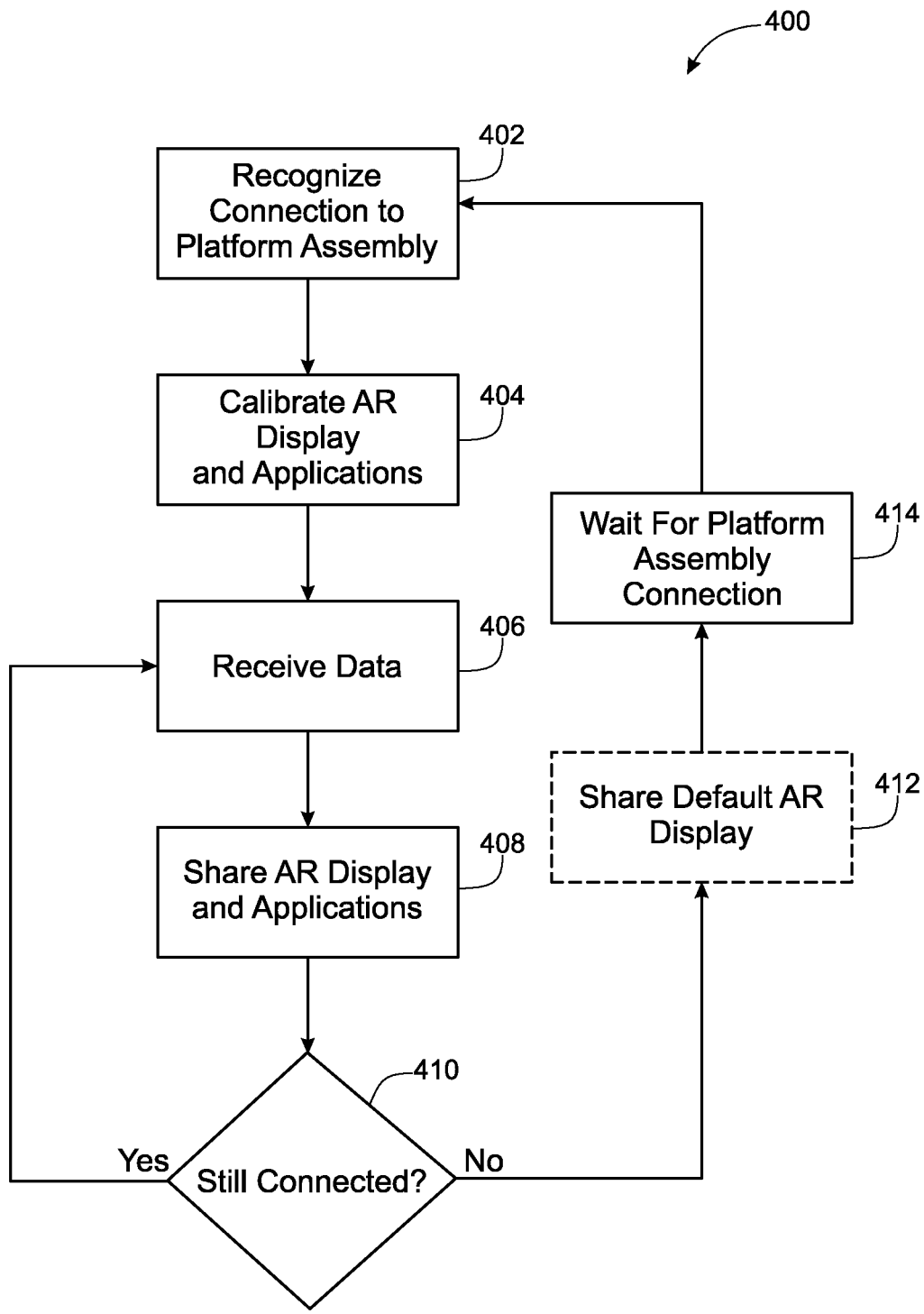
FIG. 4 is a process diagram of an illustrative embodiment of an augmented reality device 110 operation.

Depicted in FIG. 4 is a process diagram of an illustrative embodiment of an augmented reality device 110 operation 400. While the method 400 refers to one or more vehicles, vehicle-specific data, and vehicle platform assemblies 130, it should be appreciated that platform assemblies 130 may also be associated with other platforms, for example, a user-wearable device 174, such as a belt or other article that can be donned.

At step 402, the processor 118 of the augmented reality device 110 recognizes that it has been connected to a vehicle platform assembly 130, such as via the display and data interface 150 and may initiate communication protocols with platform assembly 130 via communication system 119. At step 404, processor 118 performs a calibration sequence and initializes sensors and data presentation to the augmented reality device 110. The calibration sequence can, for example, orient the head-tracking system with the vehicle so the information displayed to the user (such as weapon designation information) is accurate. For example, a tracking system mounted on the augmented reality device 110 can "see" a passive grid matrix located inside the air vehicle and calibrate the user's helmet (i.e., the augmented reality device 110) to the air vehicle's sensors. The air vehicle can now show the user video and data pertinent to where the user is looking. It also enables the user to use the augmented reality device 110 to provide weapon designation and guidance information to the weapons.

The processor 118 of augmented reality device 110 can also determine the type of connected platform assembly 130 and whether there are any user-configured displays that pertain to the connected platform. For example, if the user has configured air speed, altitude above mean sea level (MSL), altitude above ground level (AGL), and the artificial horizon to be displayed for an air vehicle, the augmented reality device 110 will recognize when it is connected to an air vehicle and will initialize those configured displays and present them to the user via optical display 112. In some embodiments, the processor(s) on the vehicle and/or the augmented reality device 110 will recognize that the augmented reality device 110 is connected to the air vehicle and will prepare to transmit, receive, and/or share data, video, and applications associated with piloting the air vehicle and performing mission tasks between the augmented reality device 110 and platform assembly 130. The augmented reality device 110 can also be configured to display avionics information (altitude, attitude, airspeed, etc.), navigational data (Global Positioning System position, route information, etc.), and mission data (weapon system status, weapon seeker head indication, etc.) to the user.

At step 406, the communication system 119 of augmented reality device 110 will receive data from the connected communication system 139 of the platform assembly 130 via the display and data interface 150. The data is typically generated by the vehicle's onboard instruments, for example, those sensing speed, Global Positioning System position and route mapping. The platform assembly 130 can also include one or more of a Global Positioning System receiver, barometer, thermometer, gyroscope, dead-reckoning navigation system, compass, cell phone, radio, Bluetooth®, WiFi®, and/or various types of built-in systems or applications.

The augmented reality devices 110 intended to provide the user with, for example, navigation and/or weapon systems targeting information from the platform, will include a portion of a position and/or orientation tracking system that allows the augmented reality device 110 and the platform assembly 130 systems to calibrate to one another so the information displayed to the user (for example, weapon designation information, target tracking information, and navigation/horizon information) is accurate. The portion of the augmented reality device 110's position and orientation tracking system mounted to the augmented reality device 110 can include an array of passive indicators or reflectors that assist the position and orientation tracking system track the position and/or orientation of the optical display 112 (which will typically correspond to the position and/or orientation of the user's head) in relation to the platform. The portion of the augmented reality device 110 position and orientation tracking system mounted to the augmented reality device 110 can also include an infrared camera system for head-tracking.

At step 408, the augmented reality device 110 displays the received data to the user enabling the user to see vehicle data (for example, vehicle instrument data) on the optical display 112 of augmented reality device 110. The augmented reality device 110 can also present to the user target aiming and designation information for an installed projectile or directed energy weapon system. Cameras or other sensors installed on the vehicle can also be presented on the optical display 112.

At step 410, the augmented reality device 110 continues to receive and display the vehicle data on the optical display 112 while the augmented reality device 110 is connected to the platform assembly 130. Once the augmented reality device 110 is disconnected from the platform assembly 130, such as when the user exits the vehicle, the processor 118 of the augmented reality device 110 may recognize the communications disconnection and, at step 412, optionally change to default display, which may be preconfigured by a user. For example, the default display can present data generated by a sensor or data collection device 114 located onboard the augmented reality device 110 to the user. As another example, the augmented reality device 110 can default to displaying no sensed data to the user, allowing the user to view only the user's surroundings. In one embodiment and/or configuration, disconnection of display and data interface 150 may optionally trigger communication systems 119 and 139 to switch to a wireless communication protocol.

At step 414, the augmented reality device 110 continues in the default operating mode (for example, displaying no sensed data or displaying a default set of data) while the augmented reality device 110 is not connected to a platform assembly 130.

After exiting the vehicle, the user can connect the augmented reality device 110 to a platform assembly 130 with a sensor worn by the user or a platform assembly associated with a vehicle. Example sensors that may be installed on a user-worn platform assembly 130 include Global Positioning System sensors, barometric sensors, dead-reckoning position sensors, and magnetic/compass sensors.

Any reference to "invention" within this document is a reference to an embodiment of a family of inventions, with no single embodiment including features that are necessarily included in all embodiments, unless otherwise stated. Furthermore, although there may be references to benefits or advantages provided by some embodiments, other embodiments may not include those same benefits or advantages, or may include different benefits or advantages. Any benefits or advantages described herein are not to be construed as limiting to any of the claims.

Likewise, there may be discussion with regards to "objects" associated with some embodiments of the present invention, it is understood that yet other embodiments may not be associated with those same objects, or may include yet different objects. Any advantages, objects, or similar words used herein are not to be construed as limiting to any of the claims. The usage of words indicating preference, such as "preferably," refers to features and aspects that are present in at least one embodiment, but which are optional for some embodiments.

Specific quantities (spatial dimensions, temperatures, pressures, times, force, resistance, current, voltage, concentrations, wavelengths, frequencies, heat transfer coefficients, dimensionless parameters, etc.) may be used explicitly or implicitly herein, such specific quantities are presented as examples only and are approximate values unless otherwise indicated. Discussions pertaining to specific compositions of matter, if present, are presented as examples only and do not limit the applicability of other compositions of matter, especially other compositions of matter with similar properties, unless otherwise indicated.

Reference systems that may be used herein can refer generally to various directions (e.g., upper, lower, forward and rearward), which are merely offered to assist the reader in understanding the various embodiments of the disclosure and are not to be interpreted as limiting. Other reference systems may be used to describe various embodiments, such as referring to the direction of projectile movement as it exits the firearm as being up, down, rearward or any other direction.

While examples, one or more representative embodiments and specific forms of the disclosure have been illustrated and described in detail in the drawings and foregoing description, the same is to be considered as illustrative and not restrictive or limiting. The description of particular features in one embodiment does not imply that those particular features are necessarily limited to that one embodiment. Some or all of the features of one embodiment can be used in combination with some or all of the features of other embodiments as would be understood by one of ordinary skill in the art, whether or not explicitly described as such. One or more exemplary embodiments have been shown and described, and all changes and modifications that come within the spirit of the disclosure are desired to be protected.

ELEMENT NUMBERING

The following is a list of element numbers and at least one noun used to describe that element. The embodiments disclosed herein are not limited to these descriptions, and these element numbers can further include other words that would be understood by a person of ordinary skill reading and reviewing this disclosure in its entirety, and other words that may be used in other locations of this document.

100 Augmented Reality System
110. Augmented Reality Device
112 Optical Display
114 Sensor
116 Display Driver
118 Processor
119 Communication Device
120 Connector
130 Platform Assembly
132 Processor
134 Sensor
136 Display Driver
138 Weapon System
139 Communication Device
140 Connector
150 Display and Data Interface
152 Data Cord
170 Air Vehicle
172 Land Vehicle
174 User Wearable Device

What is claimed is:

1. A system, comprising:
an optical system wearable and viewable by a user including an optical display and a display driver, wherein
the display driver is configured to receive non-image vehicle sensor information and present image data related to the received non-image vehicle sensor information to the optical display and
the optical display is configured to display the image data received from the display driver on the optical display;
wherein, when the optical system is connected to a first platform assembly of a first vehicle platform and a first sensor is sensing first vehicle information related to the first vehicle platform
the display driver receives the first non-image vehicle sensor information from the first sensor, generates first image data configured for the optical display based on the first non-image vehicle sensor information, and transmits the first image data to the optical display, and
the optical display displays a first optical image based on the first image data transmitted from the display driver; and
wherein, when the optical system is connected to a second platform assembly of a second vehicle platform and a second sensor is sensing second vehicle information related to the second vehicle platform,
the display driver receives the second non-image sensor information from the second sensor, generates second image data configured for the optical display based on the second non-image sensor information, and transmits the second image data to the optical display, and
the optical display displays a second optical image based on the second image data transmitted from the display driver.

2. The system of claim 1, wherein the optical display displays different information to the wearer depending on the type of platform to which the wearable display is connected.

3. The system of claim 1, wherein the system automatically calibrates the optical display to the vehicle platform to which the optical display is connected.

4. The system of claim 1, wherein
the display driver is connected to the optical display and wearable by the user,
the display driver includes a processor,
each of the two platform assemblies includes a processor, and
the display driver and each of the platform assembly processors utilize the same operating system.

5. The system of claim 1, wherein data is not transferred from the optical system to the vehicle platform to which the optical system is connected.

6. The system of claim 1, wherein data is transferred back and forth between the optical display and the platform to which the optical display is connected.

7. The system of claim 1, wherein the optical system includes a first portion of a two portion data interface and each of the first and second platforms includes a second portion of the two portion data interface.

8. The system of claim 1, wherein each platform includes at least one sensor capable of sensing information related to an operational state of the platform to which the optical display is connected.

9. An apparatus, comprising:
an augmented reality device;
at least two platforms to which the augmented reality device can connect;
means for receiving vehicle information from one of the at least two vehicle platforms and not from the other of the at least two vehicle platforms when the augmented reality device is connected to the one of the at least two vehicle platforms;
a display driver configured to convert the received vehicle information to first image data and display the first image data when the augmented reality device is connected to the one of the at least two vehicle platforms; and
means for receiving vehicle information from the other of the at least two vehicle platforms and not from the one of the at least two vehicle platforms when the augmented reality device is connected to the other of the at least two vehicle platforms,
wherein the display driver is configured to convert the received vehicle information to second image data and display the second image data when the augmented reality device is connected to the other of the at least two vehicle platforms.

10. The apparatus of claim 9, comprising:
means for transferring information from the augmented reality device to the one of the at least two platforms when the augmented reality device is connected to the one of the at least two vehicle platforms; and
means for transferring information from the augmented reality device to the other of the at least two platforms when the augmented reality device is connected to the other of the at least two vehicle platforms.

11. The apparatus of claim 9, wherein
the one of the at least two platforms is a type of vehicle selected from one of a land vehicle, a water vehicle, and an air vehicle, and
the other of the at least two platforms is a type of vehicle different from the one of the at least two platforms and selected from one of a land vehicle, a water vehicle, and an air vehicle.

12. The apparatus of claim 9, wherein the information related to the one of the at least two platforms includes at least one type of information not present in the information related to the other of the at least two platforms.

13. The apparatus of claim 9, wherein the augmented reality device is hand connectable and hand disconnectable from each of the at least two platforms.

14. The method of claim 13, comprising:
transferring information back and forth between the optical display and the platform to which the optical display is connected.

15. The method of claim 13, wherein the information related to the first vehicle platform is non-image sensor information.

16. The method of claim 13, wherein the information related to the first vehicle platform is vehicle instrument data.

17. A method, comprising:
connecting an augmented reality display to a first vehicle platform and determining a type of vehicle platform to which the augmented reality display is connected;
receiving information related to the first vehicle platform;
generating first image data related to the information received from the first vehicle platform;
displaying on the augmented reality display the first image data;
disconnecting the augmented reality display from the first vehicle platform;
connecting the augmented reality display to a second vehicle platform and determining a type of vehicle platform to which the augmented reality display is connected;
receiving information related to the second vehicle platform;
generating second image data related to the information received from the second vehicle platform; and
displaying on the augmented reality display the second image data, wherein the second image data is different from the first image data.

18. The method of claim 17, wherein said connecting an augmented reality display to a first vehicle platform includes physically connecting a data cord of the augmented reality display to the first vehicle platform, and wherein said disconnecting the augmented reality display from the first vehicle platform includes physically disconnecting the data cord of the augmented reality display from the first vehicle platform.

19. The method of claim 17, wherein said connecting an augmented reality display to a first vehicle platform includes wirelessly connecting the augmented reality display to the first vehicle platform, and wherein said disconnecting the augmented reality display from the first vehicle platform includes wirelessly disconnecting the augmented reality display from the first vehicle platform.

* * * * *